March 29, 1927.

C. T. CHADWICK ET AL 1,622,490

LOCK

Filed Aug. 26, 1924

INVENTORS,
Charles T. Chadwick and
John W. Boone;
BY
ATTORNEYS.

Patented Mar. 29, 1927.

1,622,490

UNITED STATES PATENT OFFICE.

CHARLES T. CHADWICK, OF SOMIS, AND JOHN W. BOONE, OF VAN NUYS, CALIFORNIA.

LOCK.

Application filed August 26, 1924. Serial No. 734,227.

This invention relates to signals and more particularly to theft signals for automobiles.

An object of the invention is to provide a theft signal, applicable to the ignition lock of an automobile, which will be operated if an attempt is made by a thief or an unauthorized person to unlock the ignition, thus giving warning of the attempted theft or unauthorized use of the car.
Another object is to provide a signalling device to be applied to the ignition lock switch of an automobile which may be locked, to lock the ignition circuit open and to give a signal, should an attempt be made to unlock the ignition lock switch, and which when unlocked will restore the ignition circuit to its normal condition.

Another object is to provide a theft signalling device of the character stated in which the wiring connecting the ignition lock, the lighting control, the signal buzzer and the automobile ammeter, will be enclosed and locked, with the ignition circuit open and the ignition lock switch included and locked in the buzzer circuit, which circuit will be closed if an attempt is made by a thief or an unauthorized person to unlock the ignition lock.

With the above and other objects in view, the invention consists in the novel and useful provision, formation, construction and association of parts, members and features, all as hereinafter described, shown in the drawing, and finally pointed out in claims.
In the drawing:

Figure 1:
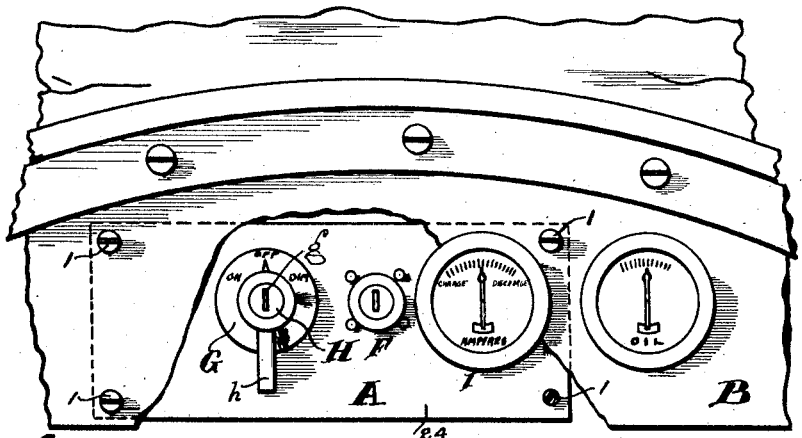
Figure 1 is a front view of the instrument board of an automobile and the signalling device applied to the ignition lock and ammeter on said board;
Figure 2:
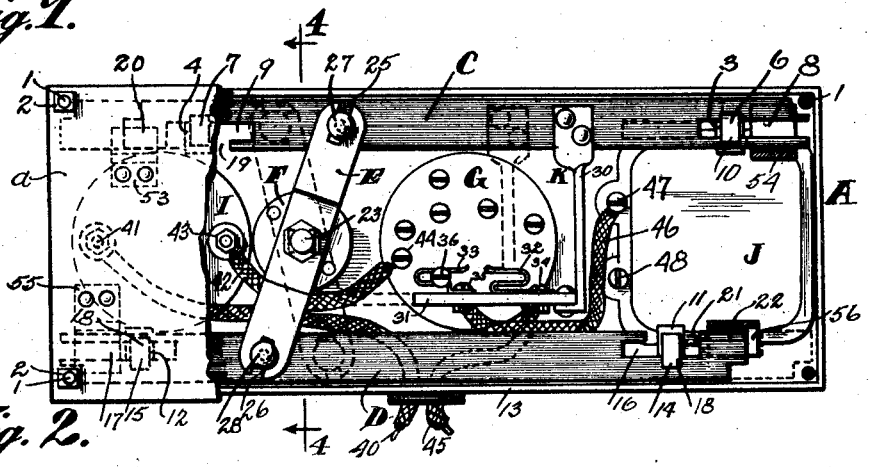
Figure 2 is a rear view of the signalling device with the cover thereof partly broken away to show the working parts of the device.
Figure 3:
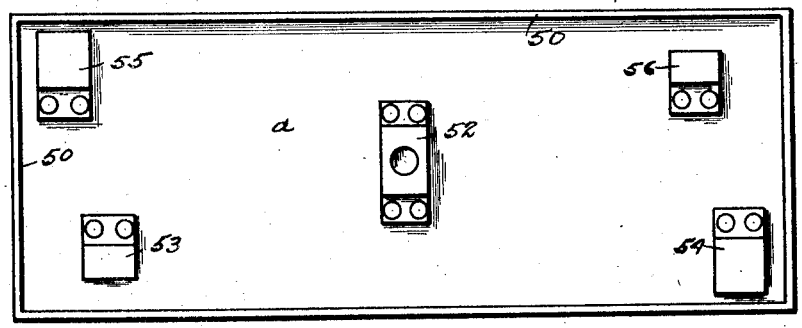
Figure 3 is an inside plan view of the casing cover.
Figure 4:
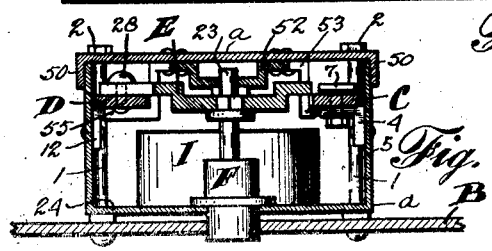
Figure 4 is a cross sectional view of the invention taken on the line 4—4 of Fig. 2.

Corresponding parts in all the figures are designated by the same reference characters.
Referring with particularity to the drawing, A designates a casing having an open rear side closed by a cover $a$. The casing is detachably secured under the instrument board B of an automobile, and the cover is detachably secured on the rear of the casing by screws 1 and nuts 2, the screws extending through instrument board, and through the casing and cover at the corners thereof, and the nuts screwing on the ends of the screws against the rear and outer side of the cover. Angle iron brackets 3 and 4 are secured to the inside of the upper wall 5 of the casing A, from which brackets a locking bolt C is slidably suspended at its ends respectively by means of hangers 6 and 7 depending respectively from said brackets through longitudinal slots 8 and 9 in the ends respectively of the bolt, the hangers being formed with heads 10 on their lower ends upon which said bolt rests. Angle iron brackets 11 and 12 are secured to the inside of the lower wall 13 of the casing A, from which brackets a locking bolt D is slidably suspended at its ends respectively by means of hangers 14 and 15 depending respectively from said brackets through longitudinal slots 16 and 17 in the ends respectively of the bolt, the hangers being formed with heads 18 on their lower ends upon which the bolt rests. The bolt C is provided with a notch 19 in its inner edge leading into the slot 9, and a locking end 20 is formed on the end of the bolt beyond the outer end of said slot and notch. The bolt D is provided with a notch 21 in its inner edge leading into the slot 16, and a locking end 22 is formed on the end of the bolt beyond the outer end of said slot and notch. A double arm E is secured on the end of a stud 23 projecting from the inner end of the tumbler of a lock F which is mounted in the casing A and projects through the front wall 24 of said casing and through the instrument board B. The ends of the arm E are provided with slots 25 and 26 through which extends pins 27 and 28 on the bolts C and D respectively.

The ignition lock switch G and lighting control H of the car are mounted in the casing A with the lock G of said switch and the operating arm of said control located outside the front of the casing and extending through the instrument board B. The ammeter I of the car is also mounted within the casing A and extends through the front wall of the casing and through the instrument board. A buzzer J is also mounted within the casing A.

A circuit controlling element K comprises an arm 30, secured to the bolt C within the casing A, a bar 31 of insulation secured to said arm and a pair of clip contacts 32 and 33 secured on said bar by binding posts 34 and 35 respectively in alignment for alternately engaging the coil terminal 36 of the ignition lock switch G as the bolt C is moved into or out of locking position, which will be more fully described hereinafter.

The battery lead 40 of the ignition circuit connects to one terminal 41 of the ammeter I, and a lead 42 connects to the other terminal 43 of the ammeter and to the supply terminal 44 of ignition lock switch G in the usual manner. The lead 45 which extends to the ignition system, instead of being connected to the coil terminal 36 of said lock switch, is connected by binding post 34 to contact 32. A lead 46 is connected at one end, by binding post 35, to contact 33 and at its other end to one terminal 47 of buzzer J. The other terminal 48 of the buzzer is grounded on the casing A.

The cover a is formed with an edge flange 50 which overlaps the lower, upper and end walls of the casing A. On the under side of the cover a is secured a bearing 52, and cleats 53, 54, 55 and 56, the bearing 52 being adapted to receive the end of the lock stud 23, the cleats 53 and 54 being adapted to receive the ends of the bolt C, and the cleats 55 and 56 being adapted to receive the ends of the bolt D.

When the cover a is unlocked the arm E is swung counterclockwise so that the bolt C will be drawn to the left and the bolt D will be drawn to the right with the left end of bolt C against the left end wall of casing A and the right end of said bolt away from the right end wall of the casing, and with the left end of bolt D away from the left end wall of the casing and the right end of said bolt against the right end wall of the casing. With the bolts in such position the cover a may be placed on the casing, the cleats 53 and 56 passing between the ends respectively of the bolts C and D and the adjacent end walls of the casing, and the cleats 54 and 55 passing through the slots 19 and 21. Upon turning the key in the casing lock F to lock the casing the arm E is swung clockwise and the bolts C and D respectively drawn to the right and left, the right and left ends of said bolts passing respectively under the cleats 53, 54, 55 and 56, thus locking the cover on the casing and locking the wiring, leading to the lock switch G, ammeter I and buzzer J, within the casing so that the wiring connections cannot be tampered with without unlocking the casing lock F removing the screws 1 and cover a.

When the cover a is thus locked on the casing A by the bolts C and D, the contact 33 engages the terminal 36 of the lock switch and when the cover is unlocked the contact 32 engages said terminal.

When the cover is locked by said bolts, if a thief or unauthorized person should attempt to unlock the ignition lock switch G to close the ignition-circuit, he would fail, owing to the disconnection of the terminal 36 and lead 45, and instead thereof would close the buzzer circuit through battery lead 40, ammeter I, lead 42, lock switch G, terminal 36, contact 33, lead 46 and buzzer J back through ground to battery (not shown), thus sounding the buzzer and giving warning of an attempted theft or unauthorized use of the automobile.

When the cover is unlocked by inserting the proper key in lock F and turning the key, the contact 32 being in engagement with terminal 36 of lock switch G; said lock switch upon being unlocked will close the ignition circuit through battery lead 40, ammeter I, lead 42, lock switch G, and lead 45 in the usual manner, so that the engine may be run to drive the car.

When the cover is locked on the casing the lighting control H may be operated in the usual manner by turning the arm h.

It is obvious that various changes and modifications may be made in practicing the invention, in departure from the showing of the drawing, without departing from the true spirit of the invention.

Having thus described our invention, we claim and desire to secure by Letters Patent:

1. Improvements in lock switches, including a casing, a cover for the casing, and a lock for locking said cover on the casing comprising cleats on the inside of said cover, locking bolts mounted in the casing, and means actuated by the tumbler of the lock for introducing said bolts under said cleats to prevent removal of the cover from the casing when the lock is locked, and for withdrawing said bolts from under said cleats when the lock is unlocked.

2. Improvements of the character disclosed, including a casing, a cover for the casing, a lock for locking said cover on the casing; said lock including cleats on the inside of the cover, locking bolts mounted in the casing, means actuated by the tumbler of the lock for introducing said bolts under said cleats to lock the cover on the casing or for withdrawing said bolts from under said cleats to unlock the cover.

3. Improvements of the character disclosed, including a casing, a locking bolt within the casing, an arm rotatably secured to the casing and in engagement with the locking bolt, means for slidably mounting the locking bolt in the casing; one end of said locking bolt being slotted, and the opposite end of said locking bolt being provided with a lock portion, said means for mounting the bolt in the casing being received in the slot, and there being means for cooperating with the lock portion of the bolt when the bolt is moved in one direction.

4. Improvements of the character disclosed, including a casing, two locking bolts within said casing and spaced apart, an arm rotatably secured to said casing and between the two locking bolts and adapted to move said locking bolts in opposite directions when the arm is rotated; a cover for said casing provided with means adapted to engage with said bolts to lock the cover to the casing when the arm is rotated in a certain direction to move the bolts into engagement with the said means.

In testimony whereof, we have signed our names to this specification.

CHARLES T. CHADWICK.
JOHN W. BOONE.